June 1, 1948.　G. E. MILLER ET AL　2,442,372
METHOD OF MANUFACTURING SODIUM METHYL ARSONATE
Filed Feb. 1, 1932
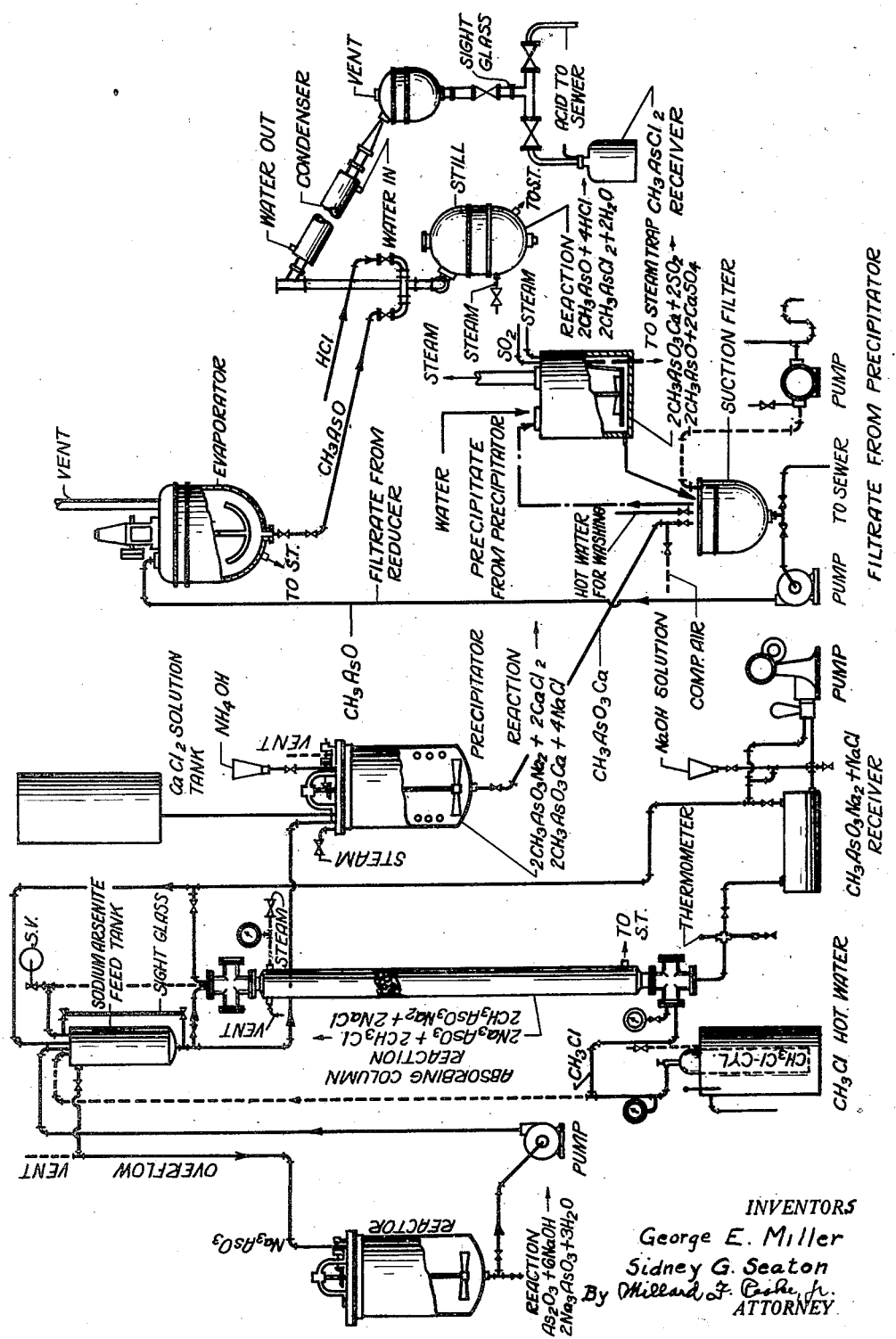
INVENTORS
George E. Miller
Sidney G. Seaton
By Millard J. Cooke, Jr.
ATTORNEY Patented June 1, 1948

2,442,372

UNITED STATES PATENT OFFICE 2,442,372

METHOD OF MANUFACTURING SODIUM METHYL ARSONATE

George E. Miller, Edgewood Arsenal, Md., and Sidney G. Seaton, La Salle, Ill., assignors to the United States of America as represented by the Secretary of War Application February 1, 1932, Serial No. 590,302

7 Claims. (Cl. 260—442)

(Granted under the act of March 3, 1883, as amended April 30, 1928; 370 O. G. 757)

This invention described herein may be manufactured and used by or for the Government for government purposes, without payment to us of any royalty thereon.

The invention relates to a process for methylating sodium arsenite and more particularly has reference to the formation of sodium methyl arsonate and its derivatives.

In the past, sodium methyl arsonate has been formed by the addition of a methylating agent to sodium arsenite solution. Several processes have been evolved to carry this out, one of which employs methyl iodide as the methylating agent, while a second uses dimethyl sulphate for the formation of the sodium methyl arsonate. Both of these methods possess the disadvantage and defect that expensive raw materials are required, with the result that the sodium methyl arsonate and its derivatives can be produced only at an excessive cost.

In the first process mentioned above; namely, that employing methyl iodide as a methylating agent, a prohibitive amount of iodine is lost, even where an efficient method for its recovery is associated with the main process. Hence, it should be noted that besides the high cost of the raw materials, large scale production is limited by the available supply of iodine.

The process employing dimethyl sulphate as the methylating agent, possesses the added disadvantage that only one of the methyl groups of the dimethyl sulphate is used in the formation of the reaction product desired, the other group giving rise to sodium methyl sulphate as a by-product. Hence, this method is attended by the additional expense created by the loss of the methylating agent, and the removal of the by-product formed.

While some attempts have been made to employ methyl chloride (CH₃Cl) as a methylating agent for sodium arsenite in the formation of sodium methyl arsonate and its derivatives, they have been on the whole unsuccessful. Endeavors to form sodium methyl arsonate by bubbling methyl chloride through a sodium arsenite solution, have resulted in substantially no reaction whatever.

The major object of this invention is the provision of a process for the formation of sodium methyl arsonate and its derivatives which is of an inexpensive nature and affords a practical method for the manufacture of these compounds.

An equally important object of the invention is the provision of a process for the formation of sodium methyl arsonate and its derivatives which employs methyl chloride as a methylating agent.

Another object of the invention is the provision of a process involving the formation of sodium methyl arsonate, the reaction taking place in a closed system under pressure and at an elevated temperature, methyl chloride being employed as a methylating agent.

Yet another object of the invention is the provision of a method for forming sodium methyl arsonate in which arsenious oxide is methylated by methyl chloride, the formation of the sodium methyl arsonate being carried out in a closed system in which the arsenious oxide is continuously circulated.

A further object of the invention is the provision of a process for the formation of methyl arsonic acid and its derivatives in which the methyl arsonic acid is separated from the reaction mass as a calcium salt.

Yet a further object of the invention is the provision of a method for forming sodium methyl arsonate by employing methyl chloride as a methylating agent, treating the sodium methyl arsonate formed so that methyl arsonic acid is precipitated as a calcium salt and deriving methyldichlorarsine from the methyl arsonic acid.

With these and other objects in view which may be incident to our improvements, the invention consists in the method to be herein set forth and claimed, with the understanding that the several necessary steps comprising the invention may be accomplished in any order found most suitable for carrying the same into practical effect, without departing from the spirit of the invention and the scope of the appended claims.

As has been previously pointed out, methods employed in the past for the production of sodium methyl arsonate as well as methyl arsonic acid and its derivatives depend upon methylating sodium arsenite solution. The present invention has for its concept the formation of sodium methyl arsonate within a closed system under pressure by the use of methyl chloride as a methylating agent. Also the invention further comprehends the treatment of the sodium methyl arsonate so formed, in such a manner as to obtain methyl arsonic acid which is precipitated from the resulting reaction as a calcium salt. The methyl arsonic acid thus formed may then be treated so as to free it from its calcium salt or by the addition of suitable reagents its derivatives such as methyldichlorarsine may be obtained.

Bearing in mind the above brief outline of the process, one illustration thereof will be given. It is to be understood, however, that the steps and quantities to be hereinafter outlined, may be varied without departing from the spirit of the invention or the scope of the appended claims.

In the accompanying drawing there is shown a flow sheet with legends to illustrate the process.

In carrying out the invention, a solution of sodium arsenite in water is formed in accordance with the following well-known equation:

$$As_2O_3 + 6NaOH \rightarrow 2Na_3AsO_3 + 3H_2O$$

It should be noted that a sufficient amount of sodium hydroxide is employed, so that its combination with the arsenious oxide so as to form sodium orthoarsenite is assured. As an illustration of the sodium arsenite solution and its constituents, we have found that twenty-five pounds of arsenious oxide and 30.3 pounds of sodium hydroxide in thirty gallons of solution, produces very satisfactory results.

The sodium arsenite solution, after preparation, is placed into a feed tank and from thence is charged at a constant rate of flow to a high tower filled with suitable inert packing. The sodium arsenite solution from the feed tank trickles downwardly through the packed tower and is returned from the bottom of the tower to the feed tank in any suitable manner. As the sodium arsenite solution descends from the top of the tower it is met by an ascending current of methyl chloride in gaseous form which is admitted at the bottom of the tower.

To carry out the methylation of the sodium arsenite solution, the system employed is a closed one and is maintained at substantially 60° C., in any well known manner, and under a pressure of substantially sixty pounds per square inch. If desired, the pressure in the system may be obtained by injecting the gaseous methyl chloride under suitable pressure into the tower. Under these conditions, the sodium arsenite solution and the methyl chloride react to form sodium methyl arsonate according to the following equation:

$$CH_3Cl + Na_3AsO_3 \rightarrow CH_3AsO(ONa)_2 + NaCl$$

While a pressure of substantially sixty pounds per square inch and a temperature of substantially 60° C. have been disclosed, it is to be understood that either or both of these may be varied to meet the particular operating conditions encountered, without departing from the spirit of the invention and the scope of the appended claims. Of course, the temperature as well as the pressure of the system will vary depending upon the size and type of tower employed, the maximum pressure being that at which the methyl chloride gas will condense under operating conditions.

The apparatus as described, is maintained as a closed system at the temperature and pressure mentioned, while the sodium arsenite solution is continuously circulated from the charging tank through the tower and returned to the former, and the methyl chloride gas is admitted at the bottom of the tower. Circulation of the sodium arsenite solution is continued until substantially 90% of it has been converted into sodium methyl arsonate. This point may be determined in any suitable and well known manner.

It should be noted that with the use of methyl chloride as a methylating agent, a side reaction occurs with the loss of methyl chloride and sodium hydroxide (from the arsenious oxide) as shown by the equation:

$$CH_3Cl + NaOH \rightarrow CH_3OH + NaCl$$

When the loss of sodium hydroxide has reached a point where its ratio to the arsenious oxide is below that required for the formation of sodium orthoarsenite, methylation is substantially arrested. In order to avoid this difficulty, sodium hydroxide is added to the original charge in excess of that required so as to compensate for its average loss in forming the methyl alcohol on the right hand side of the above equation.

The conversion of the sodium arsenite solution into sodium methyl arsonate having been completed as described, the resulting solution is run off into a tank, diluted with an equal volume of water and is then treated with a slight excess of hydrochloric acid. At this point, ammonia is added to the products within the receiving tank in order to make the solution neutral. Upon the addition, in excess, of a saturated solution of calcium chloride, and upon heating the contents of the tank to boiling, methyl arsonic acid is precipitated as a calcium salt. The use of the ammonia is for the two-fold purpose of neutralizing the solution and preventing the precipitation of calcium hydroxide upon the addition of the calcium chloride to the solution, as the ammonia combines with the chloride atoms in the acidified mixture to form ammonium chloride.

At this point of the process, the methyl arsonic acid may be formed from its calcium salt in any well-known manner, or the compound may be treated further so as to obtain derivatives of the methyl arsonic acid.

In obtaining other derivatives of methyl arsonic acid, the precipitate is filtered and washed in any suitable manner and is then diluted with water so that 25% of the whole consists of the calcium salt. Sulphur dioxide is then passed through the above suspension at room temperature, 50% more sulphur dioxide being employed than that which is theoretically required. Upon acidifying the mixture, last obtained, with sulphuric acid and heating, a complete removal of the excess sulphur dioxide is obtained.

It will be appreciated that by the treatment outlined above, a concentrated solution of methyl arsenious oxide ($CH_3AsO$) is obtained. The solution of the methyl arsenious oxide is filtered and then pumped into an evaporator where the water is evaporated down to about a 50% solution. During the filtering of the methyl arsenious oxide solution, a sludge is obtained and this is carefully washed in any well-known manner. After evaporation, hydrochloric acid is added to the methyl arsenious oxide in order to convert it to the chloride, and the methyldichlorarsine so formed is separated by distillation.

In the treatment of the oxide with hydrochloric acid, a sufficient excess of the acid is employed so as to leave 15% solution of it after the methyldichlorarsine has been distilled off. From the still the hydrochloric acid and the methyldichlorarsine are readily separated into layers in the receiver and are drawn off into suitable containers. Finally the methyldichlorarsine obtained in this manner may be dried over calcium chloride, filtered and stored.

It will be noted that we have provided a simple and efficient process for the formation of sodium methyl arsonate and its derivatives. Likewise it will be appreciated that in the process readily obtainable and inexpensive compounds are employed. The process as outlined above, it may also be observed, is one which may be carried out on a large scale and is well adapted to manufacturing purposes.

Although we have described the preferred embodiment of our invention, we wish it to be understood that we do not confine ourselves to the precise details herein set forth by way of illustration, as it is apparent that many changes and variations may be made therein by those skilled in the art, without departing from the spirit of the invention or the scope of the appended claims.

We claim:

1. In a process for making sodium methyl arsonate, methylating sodium arsenite solution with methyl chloride at a pressure of substantially sixty pounds per square inch.

2. In a process for making sodium methyl arsonate, methylating sodium arsenite solution with methyl chloride, the reaction being carried out in a closed system maintained under a pressure of substantially sixty pounds per square inch.

3. In a process for making sodium methyl arsonate, methylating sodium arsenite solution with methyl chloride, the reaction being carried out in a closed system maintained under a pressure of substantially sixty pounds per square inch, and at temperatures above normal.

4. In a process for making sodium methyl arsonate, methylating sodium arsenite solution with methyl chloride, the reaction being carried out in a closed system maintained under a pressure of substantially sixty pounds per square inch and at a temperature of substantially 60° C.

5. A process of methylating sodium arsenite comprising continuously circulating sodium arsenite in a closed system maintained under a pressure of substantially sixty pounds per square inch, and admitting gaseous methyl chloride to the system.

6. A process of methylating sodium arsenite comprising continuously circulating sodium arsenite solution in a closed system maintained under a pressure of substantially sixty pounds per square inch and at a temperature above normal, and admitting gaseous methyl chloride to the system.

7. A process of methylating sodium arsenite comprising continuously circulating sodium arsenite solution in a closed system maintained under a pressure of substantially sixty pounds per square inch and at a temperature of substantially 60° C., and admitting to the system gaseous methyl chloride.

GEORGE E. MILLER.
SIDNEY G. SEATON.

REFERENCES CITED

The following references are of record in the file of this patent:

FOREIGN PATENTS

| Number | Country | Date |
|---|---|---|
| 167,157 | Great Britain | Aug. 3, 1922 |

OTHER REFERENCES

"Industrial & Engineering Chemistry," vol. 11, pages 826 and 827 (1919).

Compte Rendu, vol. 137, pp. 926 and 927 (1903).

"Chimie et Industrie," vol. 15, pages 405 and 406.